United States Patent [19]

DeNicola, Jr. et al.

[11] Patent Number: 5,310,794
[45] Date of Patent: May 10, 1994

[54] THEROMOPLASTIC BLENDS CONTAINING GRAFT COPOLYMERS OF POLYACRYLATES AS IMPACT MODIFIERS

[75] Inventors: Anthony J. DeNicola, Jr., Newark; Thomas A. Giroux, Bear, both of Del.

[73] Assignee: Himont Incorporated, Wilmington, Del.

[21] Appl. No.: 860,864

[22] Filed: Mar. 31, 1992

[51] Int. Cl.$^5$ .................. C08L 51/06; C08L 53/02
[52] U.S. Cl. ........................... 525/71; 525/70; 525/80; 525/98; 525/240; 525/241; 525/228
[58] Field of Search .............. 525/80, 71, 70, 301

[56] References Cited

U.S. PATENT DOCUMENTS

| | | | |
|---|---|---|---|
| 3,314,904 | 4/1967 | Burkus | 525/71 |
| 4,537,933 | 8/1985 | Walker et al. | 525/71 |
| 4,560,725 | 12/1985 | Van Bokhoven et al. | 525/67 |
| 4,704,431 | 11/1987 | Stuart et al. | 525/75 |
| 4,849,473 | 7/1989 | Cigna et al. | 525/86 |
| 4,937,280 | 6/1990 | Biglione | 524/504 |
| 4,957,974 | 9/1990 | Ilenda et al. | 525/70 |
| 4,990,558 | 2/1991 | DeNicola, Jr. et al. | 524/504 |

Primary Examiner—James J. Seidleck
Assistant Examiner—M. L. Warzel

[57] ABSTRACT

Disclosed are blends comprising a propylene polymer material grafted with a polymerizable monomer(s) of a polymer(s) having a Tg greater than 80° C., a propylene polymer material grafted with a polymerizable monomer(s) of a polymer(s) having a Tg less than 20° C., and optionally at least one other rubber modifier.

17 Claims, No Drawings

THERMOPLASTIC BLENDS CONTAINING GRAFT COPOLYMERS OF POLYACRYLATES AS IMPACT MODIFIERS

FIELD OF THE INVENTION

This invention relates to blends comprising (A) a propylene polymer material grafted with a polymerizable monomer(s) of a polymer(s) having a Tg greater than 80° C., (B) propylene polymer material grafted with a polymerizable monomer(s) of a polymer(s) having a Tg of less than 20° C., and optionally at least one other rubber modifier.

BACKGROUND OF THE INVENTION

Typically, graft copolymers of olefin polymer materials have been impact modified with ethylene/propylene copolymer rubber, ethylene/propylene/diene monomer rubber, and ASA polymers. For example, U.S. Pat. No. 3,314,904 describes forming a "gum plastic" by making a graft copolymer of styrene on polyethylene or polypropylene, and, in particular, a graft interpolymer of styrene, acrylonitrile, and polyethylene or polypropylene, and blending the graft copolymer with certain selected compatible rubbery materials. The grafted styrene or styrene/acrylonitrile content of the graft copolymer is 75–95%, preferably 85–95%, and more preferably 90–95%. Hence the graft copolymer is predominantly bound styrene or bound styrene/acrylonitrile, and in the graft copolymers made from polypropylene, the polypropylene is only a minor component and present as a dispersed phase. Thus the properties of the bound styrene or styrene/acrylonitrile predominate. The graft copolymer is made by subjecting the polyolefin to high-energy ionizing radiation, and then contacting the irradiated polyolefin with styrene or with styrene and acrylonitrile.

U.S. Pat. No. 4,537,933 discloses a blend of a polyolefin graft polymer, preferably a polyvinyl halide polyolefin graft polymer, and an ASA polymer. The ASA polymer is a copolymer of styrene and acrylonitrile (SAN) that is modified with an acrylate polymer, a chlorinated polyethylene or an olefin-diolefin modified polymer, such as an ethylene/propylene polyene modified polymer. The ASA polymer modified with the olefin-diolefin modified polymer has a styrene/acrylonitrile content of 60–95%. The properties of the SAN predominate since the rubber is only a minor component and present as a dispersed phase. Also, the matrix phase of the polymeric components must be miscible.

SUMMARY OF THE INVENTION

It has now been found that rigid graft copolymers comprising a propylene polymer material backbone having graft polymerized thereon a monomer(s) of a rigid polymer(s), a polymer having a glass transition temperature (Tg) of greater than 80° C., can be impact modified by blending said rigid graft copolymers with a graft copolymer comprising a propylene polymer material backbone having graft polymerized thereon a monomer(s) of a soft polymer(s), a polymer having a glass transition temperature (Tg) of less than 20° C. The blends obtained have improved impact/stiffness balance while retaining a balance of other properties, as compared to the properties of said rigid graft copolymer alone or blended with an unmodified rubber. The blends are useful as stand-alone structural plastics for injection molding articles and extruded profiles.

According to one embodiment of the present invention, there is provided a blend which comprises (A) a propylene polymer material grafted with a polymerizable monomer(s) of a polymer(s) having a Tg greater than 80° C. and (B) a propylene polymer material grafted with a polymerizable monomer(s) of a polymer(s) having a Tg of less than 20° C.

According to another embodiment of the present invention, there is provided a blend which comprises (A) a propylene polymer material grafted with a polymerizable monomer(s) of a polymer(s) having a Tg of greater than 80° C.; (B) a propylene polymer material grafted with a polymerizable monomer(s) of a polymer(s) having a Tg less than 20° C.; and (C) at least one other rubber modifier, wherein the total amount of (B)+(C) is from 10 to 70%, by weight, of the total blend.

DETAILED DESCRIPTION OF THE INVENTION

Unless otherwise specified all percentages and parts are by weight in this specification.

The propylene polymer material backbone of component (A) and (B) can be the same or different and are (i) a homopolymer of propylene, (ii) a random copolymer of propylene and an olefin selected from ethylene and $C_4$–$C_{10}$ alpha-olefins, provided that, when the olefin is ethylene, the maximum polymerized ethylene content is about 10%, preferably about 4%, and when the olefin is a $C_4$–$C_{10}$ alpha-olefin, the maximum polymerized content thereof is about 20%, preferably about 16%, or (iii) a random terpolymer of propylene with two alpha-olefins selected from the group consisting of ethylene and $C_4$–$C_8$ alpha-olefin, provided that the maximum polymerized $C_4$–$C_8$ alpha-olefin content is about 20%, preferably about 16%, and when ethylene is one of said alpha-olefins, the maximum polymerized ethylene content is about 5%, preferably about 4%. The $C_4$–$C_{10}$ alpha-olefins include linear or branched $C_4$–$C_{10}$ alpha-olefins such as 1-butene, 1-pentene, 4-methylpentene-1, 3-methyl-1-butene, 1-hexene, 3,4-dimethyl-1-butene, 1-heptene, 3-methyl-1-hexene and the like.

Preferred propylene polymer material backbones are polypropylene and ethylene/propylene random copolymer.

The propylene polymer material of component (A) has grafted thereto polymerizable monomer(s) of a rigid polymer(s) having a Tg greater than 80° C. Suitable monomer(s) are styrene, styrene/methyl methacrylate, styrene/methacrylic acid, styrene/maleic anhydride, styrene/acrylonitrile, styrene/methyl methacrylate/acrylonitrile, styrene/methyl methacrylate/maleic anhydride and styrene/acrylonitrile/maleic anhydride.

Preferred grafting monomers are styrene, styrene/methyl methacrylate, styrene/methacrylic acid and styrene/acrylonitrile.

Component (B) is a propylene polymer material having grafted thereto polymerizable monomer(s) of a rubbery polymer(s) having a Tg less than 20° C. Examples of said monomers include butyl acrylate, ethylhexyl acrylate, butyl acrylate/butyl methacrylate, butyl acrylate/ethylhexyl acrylate and ethylhexyl acrylate/butyl methacrylate. Preferred is butyl acrylate and butyl acrylate/butyl methacrylate.

Suitable particulate forms of the grafted propylene polymer material include powder, flake, granulate, spherical, cubic and the like. Spherical particulate forms prepared from a propylene polymer material having a pore volume fraction of at least about 0.07 are preferred.

Most preferred for preparing the grafted propylene polymer materials is a propylene polymer material having (1) a weight average diameter of about 0.4 to 7 mm, (2) a surface area of at least 0.1 $m^2/g$, and (3) a pore volume fraction of at least about 0.07 wherein more than 40% of the pores in the particle have a diameter larger than 1 micron. Such propylene polymer materials are commercially available from HIMONT Italia S.r.l.

The grafted propylene polymer material of components (A) and (B) of the present invention are prepared by the free radical-initiated graft polymerization of at least one monomer as set forth above, at free radical sites on propylene polymer material and olefin rubber material. The free radical sites may be produced by irradiation or by a free radical generating chemical material, e.g., by reaction with a suitable organic peroxide.

According to the method where the free radical sites are produced by irradiation, the propylene polymer material, preferably in particulate form, is irradiated at a temperature in the range of about 10° to 85° C. with high-energy ionizing radiation to produce free radical sites in the propylene polymer material. The irradiated propylene polymer material, while being maintained in a substantially non-oxidizing atmosphere, e.g., under inert gas, is then treated at a temperature up to about 100° C. for a period of at least about 3 minutes, with about from 5 to 80% of the particular grafting monomer or monomers used, based on the total weight of propylene polymer material and grafting monomer(s). After the propylene polymer material has been exposed to the monomer for the selected period of time, simultaneously or successively in optional order, the resultant grafted propylene polymer material, while still maintained in a substantially non-oxidizing environment, is treated to deactivate substantially all of the residual free radicals therein, and any unreacted grafting monomer is removed from said material.

The free radical deactivation of the resulting graft copolymer is conducted preferably by heating, although it can be accomplished by the use of an additive, e.g., methylmercaptan, that functions as a free radical trap. Typically the deactivation temperature will be at least 110° C., preferably at least 120° C. Heating at the deactivation temperature for at least 20 minutes is generally sufficient.

Any unreacted grafting monomer is removed from the graft copolymer, either before or after the radical deactivation, or at the same time as deactivation. If the removal is effected before or during deactivation, a substantially non-oxidizing environment is maintained.

In the method where the free radical sites are produced by an organic chemical compound, the organic chemical compound, preferably an organic peroxide, is a free radical polymerization initiator which has a decomposition half-life of about 1 to 240 minutes at the temperature employed during the treatment. Suitable organic peroxides include acyl peroxides, such as benzoyl and dibenzoyl peroxides; dialkyl and aralkyl peroxides, such as di-tert-butyl peroxide, dicumyl peroxide, cumyl butyl peroxide, 1,1-di-tert-butylperoxy-3,5,5-trimethyl-cyclohexane, 2,5-dimethyl-2,5-ditert-butyl-peroxyhexane, and bis(alpha-tert-butylperoxyisopropylbenzene); peroxy esters, such as tert-butylperoxypivalate, tert-butyl perbenzoate, 2,5-dimethylhexyl-2,5-di(perbenzoate), tert-butyl-di(perphthalate), tert-butyl peroctoate; and 1,1-dimethyl-3-hydroxybutylperoxy-2-ethyl hexanoate; and peroxy carbonates, such as di(2-ethylhexyl) peroxy dicarbonate, di(n-propyl)-peroxy dicarbonate, and di(4-tert-butyl- cyclohexyl)-peroxy dicarbonate. The peroxides can be used neat or in a diluent medium, having an active concentration of from 0.1 to 6.0 parts peroxide per 100 parts polypropylene, preferably from 0.2 to 3.0 pph.

According to this method, the propylene polymer material, preferably in particulate form, at a temperature of from about 60° C. to 125° C. is treated with from 0.1 to 6.0 pph of a free radical polymerization initiator described above. The polymer material is treated with about 5 to 240 pph of a grafting monomer at a rate of addition that does not exceed 4.5 pph per minute at all addition levels of 5 to 240 pph of the monomer, over a period of time which coincides with, or follows, the period of treatment with the initiator. In other words, the monomer and initiator may be added to the heated propylene polymer material at the same time or the monomer may be added 1) after the addition of the initiator has been completed, 2) after addition of the initiator has started but has not yet been completed, or 3) after a delay time or hold time subsequent to the completion of the initiator addition.

After the propylene polymer material has been grafted, the resultant grafted propylene polymer material, while still maintained in a substantially non-oxidizing environment, is treated, preferably by heating at a temperature of at least 120° C. for at least 20 minutes, to decompose any unreacted initiator and deactivate residual free radicals therein. Any unreacted grafting monomer is removed from said material, either before or after the radical deactivation, or at the same time as deactivation.

When present, the at least one other rubber modifier, component (C), is selected from (i) an olefin rubber containing 2 or more monomers selected from ethylene, propylene or butene, and optionally a non-conjugated diene, (ii) one or more monoalkenyl aromatic hydrocarbon-conjugated diene block copolymers or hydrogenated products thereof and (iii) mixtures of (i) and (ii).

Suitable examples of the olefin rubber of component (C) used in the present invention are ethylene/propylene copolymer rubber (EPR) having an ethylene content of from 30 to 70%, ethylene/butene-1 copolymer rubber (EBR) having an ethylene content of from 30 to 70%, propylene/butenecopolymer rubber (PBR) having a butene-1 content of from 30 to 70%, ethylene/propylene/non-conjugated diene monomer rubber (EPDM) having an ethylene content of 30 to 70% and diene content of from 1 to 10%, ethylene/propylene/butene terpolymer rubber (EPBR) having a propylene content of from 1 to 10% and butene content of from 30 to 70% or a propylene content of from 30 to 70% and butene content of from 1 to 10%. Examples of the non-conjugated dienes include 1,4-hexadiene, ethylidenenorborene and dicyclopentadiene.

The one or more monoalkenyl aromatic hydrocarbon-conjugated diene block copolymers used in the present invention are linear or branched A-B or A-B-A types or radial $(A-B)_n$, where n is 3–20, and hydrogenated products thereof or mixtures thereof, where A is a monoalkenyl aromatic hydrocarbon polymer block and B is a conjugated diene polymer block. Typical monoalkenyl aromatic hydrocarbon monomers are styrene, $C_{1-4}$ linear or branched alkyl ring-substituted styrene and vinyl toluene. Suitable conjugated dienes are butadiene and isoprene.

According to the present invention mixtures of the monoalkenyl aromatic hydrocarbon-conjugated diene block copolymer are selected from the group consisting of two or more of the monoalkenyl aromatic hydrocarbon conjugated diene block copolymers, two or more hydrogenated derivatives thereof, and at least one monoalkenyl aromatic hydrocarbon-conjugated diene block copolymer and at least one hydrogenated derivative thereof.

The monoalkenyl aromatic hydrocarbon-conjugated diene block copolymers have a number average molecular weight of from 45,000 to 260,000 wherein the proportion of the monoalkenyl aromatic hydrocarbon monomer in the monoalkenyl aromatic hydrocarbon-conjugated diene block copolymer ranges from 5 to 50%, preferably from 15 to 40%, and more preferably from 25 to 40%. When a mixture is used, two or more block copolymers or hydrogenated products thereof in various amounts and types can be used.

The monoalkenyl aromatic hydrocarbon-conjugated diene block copolymers and their derivatives used in the composition of the present invention are commerically available. The linear block copolymers are preferred.

The block copolymers can be synthesized according to the methods in U.S. Pat. Nos. 3,459,830 and 3,994,856. The method for hydrogenation of the conjugated diene is also known in the art. The hydrgenation catalyst which can be used includes noble metal catalyst, such as platinum, nickel catalyst and copper-chromium catalyst. Specific examples of the methods for hydrogenation are described in U.S. Pat. No. 4,188,432.

Preferably component (C) is an ethylene/ propylene copolymer rubber, an ethylene/propylene/non-conjugated diene monomer rubber and a hydrogenated styrene/butadiene/styrene block copolymer.

The grafted copolymer of propylene polymer material, component (A) is present in the amount of from 30 to 90%, preferably from 45 to 80%, based on the total blend. The grafted propylene polymer material has from 5 to 70% of the monomer(s) graft polymerized thereto, and preferably from 20 to 55%.

The grafted copolymer of component (B) is present in the amount of from 10 to 70%, preferably from 20 to 55%, based on the total blend. The grafted propylene polymer material has from 5 to 50% of the monomer graft polymerized thereto, and preferably from 10 to 45%.

In the blends of the present invention which contain component (C), the total amount (B) +(C) is from 10 to 70%, by weight of the total blend, preferably from 20 to 55%, wherein component (B) is present in an amount of from 5 to 50%, preferably from 15 to 45% and component (C) is present in an amount of from 5 to 20%, preferably from 5 to 10%.

Up to about 80 parts (total) of additives such as fillers, reinforcing agents, etc., per 100 parts of the components (A) and (B) or (A), (B) and (C) can be included in the blend. In addition, the blend may contain about from 5 to 30 parts of a propylene polymer material per 100 parts of the (A) and (B) or (A), (B) and (C), wherein suitable propylene polymer materials are as set forth herein for the propylene polymer material useful in preparing the graft copolymer.

The blends of the present invention are prepared by mechanically blending the components in conventional mixing equipment, i.e., a single or twin screw extruder, Banbury mixer or any other conventional melt compounding equipment. The order in which the components of the blend are mixed is not critical.

The present invention will be illustrated in greater detail with reference to the examples of the invention set forth below.

Examples 1-5 and Control Examples A-E

The blends of this invention are produced by a general procedure comprising tumble blending components (A) and (B), and optionally component (C) as set forth in Table I, and a stabilizing package consisting of 0.07% Sandostab P-EPQ stabilizer, 0.07% Irganox 1010 stabilizer and 0.25% DSTDP distearylthiodipropionate, until a homogeneous mixture is obtained (approximately 1 minute). The mixture of Examples 1 and 2 were extruded at 475° F. and 100 rpm in a vacuum vented, tapered, counter-rotating, intermeshing twin screw extruder manufactured by Haake. The mixtures of Examples 3-5 and Control Examples A-E were extruded at 446° F. and 375 rpm with a polymer feed rate of 35 lbs/hr in a vacuum vented, tapered, co-rotating, intermeshing twin screw extruder manufactured by Leistritz. The compounded mixture was injection molded in a 1.5 ounce, 25 ton Battenfeld injection molding machine with a barrel temperature of 450° F. and mold temperature of 140° F. The molding cycle for the tensile and flex bars consisted of a 10 second injection time, 20 second cooling time, and 2 second mold open time, with a maximum injection speed (15 setting) and a screw speed setting of 2.

The physical properties set forth in the Tables were measured by the following methods:

| | |
|---|---|
| Tensile Strength | ASTM D-638 (using a 2 in/min. crosshead without extensometer) |
| Break Elongation | ASTM D-638 |
| Yield Elongation | ASTM D-638 |
| Flexural Modulus | ASTM D-790 and D-618, Procedure A (0.5 in/min. crosshead speed and center section of a molded T-bar) |
| Flexural Strength | ASTM D-638, Procedure A (center section of a molded T-bar) |
| Notched Izod | ASTM D-256-87 |
| Weldline Strength | ASTM D-638 |

TABLE I

| Ingredients | Examples | | | | | Control | | | | |
|---|---|---|---|---|---|---|---|---|---|---|
| | 1 | 2 | 3 | 4 | 5 | A | B | C | D | E |
| PP-g-PS[1] | 43 | 63 | — | — | — | — | — | — | — | — |
| PP-g-PS[2] | — | — | 74 | 63 | 74 | 100 | 85 | 80 | 85 | 80 |
| PP-g-BA[3] | 57 | — | — | — | — | — | — | — | — | — |
| PP-g-BA[4] | — | 32 | — | — | — | — | — | — | — | — |
| PP-g-BA[5] | — | — | 16 | 32 | 16 | — | — | — | — | — |
| EP306P[6] | — | — | — | 5 | 10 | — | — | — | 15 | 20 |
| Kraton G-1652[7] | — | 5 | 10 | — | — | — | 15 | 20 | — | — |

TABLE I-continued

| Ingredients | Examples | | | | | Control | | | | |
|---|---|---|---|---|---|---|---|---|---|---|
| | 1 | 2 | 3 | 4 | 5 | A | B | C | D | E |
| Ten. Str, psi | 4386 | 4365 | 4457 | 4142 | 4165 | 6295 | 4208 | 4082 | 4017 | 3273 |
| Flex. Mod, kpsi | 241 | 247 | 200 | 218 | 228 | 342 | 187 | 188.4 | 246 | 200 |
| Flex. Str, psi | 7228 | 7621 | 6497 | 6600 | 6751 | 10,600 | 6156 | 6094 | 6827 | 5,500 |
| Yield Elong., % | 12.4 | 14.3 | 23.4 | 16.2 | 14.5 | 10.1 | 27.2 | 29.0 | 10.7 | 11.6 |
| Break Elong., % | 79.0 | 81.9 | 71.5 | 79.1 | 71.8 | 18.1 | 88.8 | 102 | 54.1 | 34.1 |
| N. Izod, ft-lb/in | 3.4 | 3.1 | 3.1 | 2.4 | 2.4 | 0.17 | 2.74 | 3.72 | 1.8 | 3.06 |

[1]Polypropylene (5 dg/10 min MFR, 0.35 cc/g porosity) grafted with styrene, 46% styrene content, 2 parts of (parts of t-butyl peroctoate/100 parts polypropylene) active peroxide, grafting temp. 120° C., styrene 85 pph, feed rate 1 pph/min for 85 min., deactivation at 135° C. for 240 min. produced by the pre-mixed addition of peroxide and monomer polymerization method set forth herein.
[2]Polypropylene grafted with stryene, 46% styrene content, 2 parts of (parts of t-butyl peroctoate/100 parts polypropylene) active peroxide, grafting temp. 115° C., styrene 85 pph, feed rate 1 pph/min for 85 min., deactivation at 135° C. for 240 min. produced by the pre-mixed addition of peroxide and monomer polymerization method set forth herein.
[3]Polypropylene (4.8 dg/10 min. MFR, 0.35 cc/g porosity) grated with butyl acrylate, 31% butyl acrylate content, 0.5 parts of (parts of t-butyl peroxyvialate/100 parts polypropylene) active peroxide, grafting temp. 80° C., butyl acrylate 45 pph, feed rate 1 pph/min. for 50 min., deactivation at 120° for 35 min. produced by the separate sequential addition of peroxide and monomer polymerization method set forth herein.
[4]Polypropylene (4.8 dg/10 min MFR, 0.35 cc/g porosity) grafted with butyl acrylate, 30.5% butyl acrylate content, 0.5 parts of (parts of t-butyl peroxypivalate/100 parts polypropylene) active peroxide, grafting temp. 80° C., butyl acrylate feed 44 pph, feed rate 1 pph/min. for 50 min., deactivation at 120° C. for 30 min. produced by the separate, sequential addition of peroxide and monomer polymerization method set forth herein.
[5]Polypropylene (4.8 dg/10 min MFR, 0.35 cc/g porosity) grafted with butyl acrylate, 31% butyl acrylate content, 0.5 parts of (t-butyl peroxypivalate/100 parts polypropylene) active peroxide, grafting temp. 80° C., butyl acrylate feed 50 pph, feed rate 1 pph/min. for 50 min., deactivation at 120° C. for 30 min. produced by the separate, sequential addition of peroxide and monomer polymerization method set forth herein.
[6]Ethylene/propylene copolymer rubber having 57% ethylene, commercially available from Polysar.
[7]Hydrogenated styrene/butadiene/styrene triblock copolymer produced by Shell Chemical Co. (29% styrene content, 71% rubber).

Examples 6-7 and Control Example F

The blends set forth in Table II were prepared according to the general procedure used for the blends of Examples 1 and 2 in Table I, except that a butyl acrylate/butyl methacrylate grafted polypropylene was used instead of the butyl acrylate grafted polypropylene.

TABLE II

| Ingredients | Examples | | Con. Ex. |
|---|---|---|---|
| | 6 | 7 | F |
| PP-g-PS[1] | 49 | 50 | 100 |
| PP-g-BA/BMA[2] | 51 | — | — |
| PP-g-BA/BMA[3] | — | 50 | — |
| Notched Izod, ft*lb/in | 2.5 | 2.5 | 0.17 |
| Tensile Strength, psi | 4319 | 4437 | 6295 |
| Flex Modulus, kpsi | 234 | 238 | 342 |
| Flex Strength, psi | 7184 | 7374 | 10,600 |
| Yield Elong., % | 11.8 | 11.1 | 10.1 |
| Break Elong., % | 62.8 | 54.7 | 18.1 |

[1]Polypropylene (5 dg/10 min MFR, 0.35 cc/g porosity) grafted with styrene. 46% styrene content, 2 parts of (parts of t-butyl peroctoate/100 parts polypropylene) active peroxide, grafting temp. 115° C., styrene 85 pph, feed rate 1 pph/min for 85 min., deactivation at 135° C. for 240 min. produced by the pre-mixed addition of peroxide and monomer polymerization method set forth herein.
[2]Polypropylene (4.8 dg/10 min MFR, 0.35 cc/g porosity) grafted with butyl acrylate/butyl methacrylate (BA/BMA), (3.6:1 wt ratio), 29.5% BA/BMA content, 0.4 parts of (parts of t-butyl peroxypivalate/100 parts polypropylene) active peroxide, grafting temp. 80° C., BA/BMA 42 pph, feed rate 1.3 pph/min for 38 min., deactivation at 120° C. for 60 min. produced by the pre-mixed addition of peroxide and monomer polymerization method set forth herein.
[3]Polypropylene (4.8 dg/10 min MFR, 0.35 cc/g porosity) grafted with butyl acrylate/butyl methacrylate, (BA/BMA), (8:1 wt ratio), 30.5% BA/BMA content, 0.5 parts active peroxide, (parts of t-butyl peroxypivalate/100 parts polypropylene), grafting temp. 80° C., BA/BMA 44 pph, feed rate 1.3 pph/min for 38 min., deactivation at 120° C. for 60 min. produced by the pre-mixed addition of peroxide and monomer polymerization method set forth herein.

Examples 8-15 and Control Examples G-K

The blends set forth in Table III were prepared according to the general procedure used for the blends in Table I, except that a styrene/acrylonitrile grafted polypropylene was used instead of the styrene grafted polypropylene. Examples 8 and 9 were extruded according to Example 1 and Examples 10-15 and Control Examples G-K were extruded according to Example 3 of Table 1.

Examples 16-18 and Control Example L

The blends set forth in Table IV were prepared according to the general procedure used for the blends in Table I, except that a styrene/methyl methacrylate grafted polypropylene was used instead of the styrene grafted polypropylene. Example 16 was extruded according to Example 1 and Examples 17 and 18 and Control Example L were extruded according to Example 3.

TABLE III

| Ingredients | Examples | | | | | | | | Controls | | | | |
|---|---|---|---|---|---|---|---|---|---|---|---|---|---|
| | 8 | 9 | 10 | 11 | 12 | 13 | 14 | 15 | G | H | I | J | K |
| PP-g-PSAN[1] | 57 | 43 | — | — | — | — | — | — | — | — | — | — | — |
| PP-g-PSAN[2] | — | — | 52 | 36 | 74 | 63 | 74 | 63 | 100 | 85 | 80 | 85 | 80 |
| PP-g-BA[3] | 43 | 57 | — | — | — | — | — | — | — | — | — | — | — |
| PP-g-BA[4] | — | — | 48 | 64 | 16 | 32 | 16 | 32 | — | — | — | — | — |
| EP306P | — | — | — | — | — | — | 10 | 5 | — | — | — | 15 | 20 |
| Kraton G-1652 | — | — | — | — | 10 | 5 | — | — | — | 15 | 20 | — | — |
| Ten. Str, psi | 3766 | 3532 | 3657 | 3303 | 4000 | 3856 | 3846 | 3737 | 5737 | 3970 | 3550 | 3654 | 3049 |

TABLE III-continued

| Ingredients | Examples | | | | | | | | Controls | | | | |
|---|---|---|---|---|---|---|---|---|---|---|---|---|---|
| | 8 | 9 | 10 | 11 | 12 | 13 | 14 | 15 | G | H | I | J | K |
| Flex. Mod, kpsi | 243 | 221 | 184 | 165 | 194 | 184 | 203 | 200 | 339 | 193 | 169 | 218 | 181 |
| Flex. Str, psi | 6848 | 6159 | 5534 | 4985 | 6082 | 5714 | 5867 | 5795 | 9934 | 6048 | 5350 | 5927 | 4883 |
| Yield Elong, % | 13.7 | 14.0 | 18.8 | 19.4 | 18.9 | 19.9 | 16.7 | 18.4 | 9.78 | 19.0 | 20.1 | 14.0 | 14.4 |
| Break Elong, % | 20.6 | 23.9 | 101 | 729 | 71.7 | 92.0 | 53.5 | 80.9 | 18.9 | 58.0 | 95.1 | 58.8 | 54.9 |
| N. Izod, ft-lb/in | 0.8 | 1.2 | 1.5 | 2.1 | 1.3 | 1.4 | 1.4 | 1.2 | 0.21 | 1.73 | 2.3 | 2.6 | 3.6 |

[1]Polypropylene grafted with styrene/acrylonitrile (SAN) (3:1 wt ratio), 46% styrene/acrylonitrile content, 1.2 parts of (parts of t-butyl peroctoate/100 parts polypropylene) active peroxide, grafting temp. 120° C., SAN 85 pph, feed rate 1 pph/min for 85 min., deactivation at 140° C. for 120 min. produced by the pre-mixed addition of peroxide and monomer polymerization method set forth herein.
[2]Polypropylene grafted with styrene/acrylonitrile (SAN) (3:1 wt ratio), 46% SAN content, 1.6 parts of (parts of t-butyl peroxypivalate/100 parts polypropylene) active peroxide, grafting temp. 90° C., SAN 85 pph, feed rate 1 pph/min for 85 min. deactivation at 90° C. for 120 min. produced by the pre-mixed addition of peroxide and monomer polymerization method set forth herein.
[3]Polypropylene grafted with butyl acrylate (BA), 31% butyl acrylate content, 0.5 parts of (parts of t-butyl peroxypivalate/100 parts polypropylene) active peroxide, grafting temp. 80° C., BA 45 pph, feed rate 1 pph/min. for 50 min., deactivation at 120° C. for 35 min. produced by the separate, sequential addition of peroxide and monomer polymerization method set forth herein.
[4]Polypropylene grafted with butyl acrylate (BA), 31% butyl acrylate content, 0.5 parts of (parts of t-butyl peroxypivalate/100 parts polypropylene) active peroxide, grafting temp 80° C., BA 50 pph, feed rate 1 pph/min, for 50 min, deactivation at 120° C. for 30 min. produced by the peroxide method set forth herein.

TABLE IV

| Ingredients | Examples | | | Con. Ex. |
|---|---|---|---|---|
| | 16 | 17 | 18 | L |
| PP-g-PSMMA[1] | 57 | — | — | — |
| PP-g-PSMMA[2] | — | 52 | 36 | 100 |
| PP-g-BA[3] | 43 | — | — | — |
| PP-g-BA[4] | — | 48 | 64 | — |
| Ten. Str, psi | 5007 | 4450 | 3935 | 6930 |
| Flex. Mod, kpsi | 246 | 226 | 195 | 358 |
| Flex. Str, psi | 7947 | 7118 | 5986 | 11830 |
| Yield Elong, % | 14 | 16.6 | 17.9 | 11.7 |
| Break Elong, % | 60 | 95.8 | 193 | 25.7 |
| N. Izod, ft-lb/in | 1.6 | 1.1 | 1.8 | 0.2 |

[1]Polypropylene (9 dg/10 min MFR, 0.53 cc/g porosity) grafted with styrene/methyl methacrylate (SMMA) (1.8:1 wt ratio), 46% styrene/methyl methacrylate content, 1.65 parts of (parts tert-butyl peroctoate/100 parts polypropylene) active peroxide, grafting temp. 100° C., SMMA 86 pph, feed rate 1.25 pph/min. for 67 min., deactivation at 120° C. for 120 min., produced by the pre-addition of peroxide and monomer polymerization method set forth herein.
[2]Polypropylene (5 dg/10 min MFR, 0.35 cc/g porosity) grafted with styrene/methyl methacrylate (SMMA) (1:0.52 wt. ratio), 41% SMMA content, 1.2 parts of (parts tert-butyl peroctoate/100 parts polypropylene) active peroxide, grafting temp. 100° C., SMMA 1 pph, feed rate 1 pph/min. for 70 min., deactivation at 140° C. for 120 min., produced by the pre-mixed addition of peroxide and monomer polymerization method set forth herein.
[3]Polypropylene (4.8 dg/10 min MFR, 0.35 cc/g porosity) grafted with butyl acrylate (BA), 31% butyl acrylate content, 0.5 parts of (parts of t-butyl peroxypivalate/100 parts polypropylene) active peroxide, grafting temp 80° C., butyl acrylate 45 pph, feed rate 1 pph/min. for 50 min., deactivation at 120° C. for 35 min. produced by the separate, sequential addition of peroxide and monomer polymerization method set forth herein.
[4]Polypropylene (4.8 dg/10 min MFR, 0.35 cc/g porosity) grafted with butyl acrylate (BA), 31% butyl acrylate content, 0.5 parts of (parts of t-butyl peroxypivalate/100 parts polypropylene) active peroxide, grafting temp 80° C., butyl acrylate 50 pph, feed rate 1 pph/min. for 50 min., deactivation at 120° C. for 30 min. produced by the peroxide method set forth herein.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A thermoplastic blend consisting essentially of, by weight (A) 30 to 90% of a propylene polymer material grafted with a polymerizable monomer(s) of a polymer(s) having a Tg greater than 80° C. and polymerized monomer(s) content of 5 to 70% selected from the group consisting of styrene, styrene/methyl methacrylate, styrene/methacrylic acid and styrene/acrylonitrile and (B) 10% to 70% of propylene polymer material grafted with a polymerizable monomer(s) of a polymer(s) having a Tg less than 20° C. and a polymerized monomer content of 5 to 50% selected from the group consisting of butyl acrylate, butylacrylate/butyl methacrylate and butyl acrylate/ethylhexyl acrylate.

2. The blend of claim 1, wherein said propylene material is selected from the group consisting of a homopolymer of propylene, a random copolymer of propylene and an olefin selected from ethylene and $C_4$-$C_{10}$ alpha-olefins having a maximum polymerized ethylene content of about 10% and maximum polymerized $C_4$-$C_{10}$ alpha-olefin content of about 20%, and a random terpolymer of propylene with two alpha-olefins selected from the group consisting of ethylene and $C_4$-$C_8$ alpha-olefin having a maximum polymerized $C_4$-$C_8$ alpha-olefin content of about 20%, and when ethylene is present a maximum polymerized ethylene content of about 5%.

3. The blend of claim 1, wherein the polymerizable monomer is butyl acrylate.

4. The blend of claim 1, wherein (A) is a graft copolymer of styrene on a polypropylene backbone and (B) is a graft copolymer of butyl acrylate on a polypropylene backbone.

5. The blend of claim 1, wherein (A) is a graft copolymer of styrene on a polypropylene backbone and (B) is a graft copolymer of butyl acrylate/butyl methacrylate on a polypropylene backbone.

6. The blend of claim 1, wherein (A) is a graft copolymer styrene/methyl methacrylate on a polypropylene backbone and (B) is a graft copolymer of butyl acrylate on a polypropylene backbone.

7. The blend of claim 1, wherein (A) is a graft copolymer of styrene/methyl methacrylate on a polypropylene backbone and (B) is a graft copolymer of butyl acrylate/butyl methacrylate on a polypropylene backbone.

8. The blend of claim 1, wherein (A) is a graft copolymer of styrene/acrylonitrile on a polypropylene backbone and (B) is a graft copolymer of butyl acrylate on a polypropylene backbone.

9. The blend of claim 1, wherein (A) is a graft copolymer of styrene/acrylonitrile on a polypropylene backbone and (B) is a graft copolymer of butyl acrylate/butyl methacrylate on a polypropylene backbone.

10. A thermoplastic blend consisting essentially of, by weight, (A) 30 to 90% of a propylene polymer material grafted with a polymerizable monomer(s) of a polymer(s) having a Tg greater than 80° C. and polymerized monomer(s) content of 5 to 70% selected from the group consisting of styrene, styrene/methyl methacrylate, styrene/methacrylic acid and styrene/acrylonitrile, (B) 10 to 70% of propylene polymer material grafted with a polymerizable monomer(s) of a polymer(s) having a Tg less than 20° C. and a polymerized monomer content of 5 to 50% selected from the group consisting of butyl acrylate, butylacrylate/butyl methacrylate and butyl acrylate/ethylhexyl acrylate and (c) 5 to 20% of at least one other rubber modifier, wherein the total amount of (B)+(C) is from 10 to 70% by weight based on the total blend.

11. The blend of claim 10, wherein said propylene polymer material is selected from the group consisting of a homopolymer of propylene, a random copolymer of propylene and an olefin selected from ethylene and $C_4$–$C_{10}$ alpha-olefins having a maximum polymerized ethylene content of about 10% and a maximum polymerized $C_4$–$C_{10}$ alpha-olefin content of about 20%, and a random terpolymer of propylene with two alpha-olefins selected from the group consisting of ethylene and $C_4$–$C_8$ alpha-olefin having a maximum polymerized $C_4$–$C_8$ alpha-olefin content of about 20%, and when ethylene is present a maximum polymerized ethylene content of about 5%.

12. The blend of claim 13, wherein said at least one other rubber modifier is selected from the group consisting of (i) an olefin rubber containing 2 or more monomers selected from ethylene, propylene or butene, and optionally a non-conjugated diene, (ii) one or more monoalkenyl aromatic hydrocarbon-conjugated diene block copolymer of hydrogenated products thereof having a number average molecular weight of from 45,000 to 260,000 and monoalkenyl aromatic hydrocarbon monomer content of from 5 to 50% and mixtures of (i) and (ii).

13. The blend of claim 10, wherein (A) is a graft copolymer of styrene on a polypropylene backbone, (B) is a graft copolymer of butyl acrylate on a polypropylene backbone and (c) is an ethylene/propylene copolymer rubber.

14. The blend of claim 10, wherein (A) is a graft copolymer of styrene on a polypropylene backbone, (B) is a graft copolymer of butyl acrylate on a polypropylene backbone and (C) is hydrogenated styrene/butadiene/styrene block copolymer.

15. The blend of claim 10, wherein (A) is present in an amount of from 45 to 80%, (B) is present in an amount of from 15 to 45% and (C) is present in an amount of from 5 to 10%.

16. The blend of claim 10, wherein (A) is a graft copolymer of styrene/acrylonitrile on a polypropylene backbone, (B) is a graft copolymer of butyl acrylate on a polypropylene backbone and (C) is a hydrogenated styrene/butadiene/styrene block copolymer.

17. The blend of claim 10, wherein (A) is a graft copolymer of styrene/acrylonitrile on a polypropylene backbone, (B) is graft copolymer of butyl acrylate on a polypropylene backbone and (C) is an ethylene/propylene copolymer rubber.

* * * * *